United States Patent
Kanayama et al.

(10) Patent No.: US 10,989,159 B2
(45) Date of Patent: Apr. 27, 2021

(54) CONTROL DEVICE OF GENERAL-PURPOSE ENGINE

(71) Applicant: HONDA MOTOR CO., LTD., Tokyo (JP)

(72) Inventors: Hisanori Kanayama, Wako (JP); Takashi Hashizume, Wako (JP); Akifumi Fujima, Wako (JP); Keiichiro Bungo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 16/328,828

(22) PCT Filed: Mar. 31, 2017

(86) PCT No.: PCT/JP2017/013855
§ 371 (c)(1),
(2) Date: Feb. 27, 2019

(87) PCT Pub. No.: WO2018/179446
PCT Pub. Date: Oct. 4, 2018

(65) Prior Publication Data
US 2019/0211795 A1    Jul. 11, 2019

(51) Int. Cl.
*F02D 29/00* (2006.01)
*F02D 29/02* (2006.01)
(Continued)

(52) U.S. Cl.
CPC ........... *F02P 5/1506* (2013.01); *B60W 50/02* (2013.01); *E01H 5/04* (2013.01); *F02D 11/02* (2013.01);
(Continued)

(58) Field of Classification Search
CPC ...... F02D 41/021; F02D 41/22; F02D 41/263; F02D 41/266; F02D 41/222;
(Continued)

(56) References Cited

U.S. PATENT DOCUMENTS 4,532,594 A * 7/1985 Hosaka ................ F02D 41/266
700/82
5,565,687 A * 10/1996 Berrill .................... G01D 5/145
250/577

(Continued)

FOREIGN PATENT DOCUMENTS

DE    102011088764 A1    6/2013
DE    102013221343 A1    4/2014
(Continued)

OTHER PUBLICATIONS

European Search Report dated Feb. 11, 2020, 8 pages.
(Continued)

*Primary Examiner* — Phutthiwat Wongwian
*Assistant Examiner* — Arnold Castro
(74) *Attorney, Agent, or Firm* — Rankin, Hill & Clark LLP (57) ABSTRACT

A control device of a general-purpose engine which can continue operation of a working machine even when an operation management unit of the working machine has failed. The control device includes an engine control unit that controls the general-purpose engine based on a command from the operation management unit managing an operating state of the working machine, a communication interface for communicating with an external device; a management program acquisition unit that acquires a management program that is used by the operation management unit to manage the operating state, from the external device through the communication interface and stores the acquired (Continued)

management program in a storage medium, and an operation management substitute unit that manages the operating state of the working machine in place of the operation management unit in accordance with the management program when a failure of operation management unit is detected.

4 Claims, 5 Drawing Sheets

(51) Int. Cl.

| | | |
|---|---|---|
| *F02P 5/15* | (2006.01) | |
| *F02D 11/10* | (2006.01) | |
| *F02D 11/02* | (2006.01) | |
| *F02D 41/22* | (2006.01) | |
| *F02P 5/16* | (2006.01) | |
| *F02D 37/02* | (2006.01) | |
| *E01H 5/04* | (2006.01) | |
| *F02D 41/24* | (2006.01) | |
| *B60W 50/02* | (2012.01) | |
| *F02D 41/26* | (2006.01) | |

(52) U.S. Cl.
CPC ............ *F02D 11/105* (2013.01); *F02D 29/00* (2013.01); *F02D 29/02* (2013.01); *F02D 37/02* (2013.01); *F02D 41/222* (2013.01); *F02D 41/2487* (2013.01); *F02D 41/263* (2013.01); *F02P 5/16* (2013.01)

(58) Field of Classification Search
CPC ...... F02D 41/2487; F02D 29/00; F02D 29/02; F02D 11/02; F02D 11/105; F02D 37/02; F02D 2041/227; F02D 2041/228; F02P 5/16; F02P 5/1506; E01H 5/04; B60W 50/02; B60W 50/023
See application file for complete search history.

(56) References Cited

U.S. PATENT DOCUMENTS

| | | | |
|---|---|---|---|
| 6,230,089 B1 * | 5/2001 | Lonn | A01D 34/475 |
| | | | 701/34.3 |
| 6,336,439 B1 * | 1/2002 | Frohn | F02D 41/2422 |
| | | | 123/406.13 |
| 6,487,717 B1 | 11/2002 | Brunemann et al. | |
| 6,629,022 B1 * | 9/2003 | Gessner | G05B 19/042 |
| | | | 701/1 |
| 6,823,251 B1 * | 11/2004 | Giers | B60G 17/0185 |
| | | | 303/122 |
| 7,634,350 B2 * | 12/2009 | Carlton | G05B 9/03 |
| | | | 701/114 |
| 2003/0105537 A1 | 6/2003 | Crispin et al. | |
| 2003/0144778 A1 | 7/2003 | Miyano | |
| 2005/0120281 A1 * | 6/2005 | Takatori | G06F 9/4405 |
| | | | 714/54 |
| 2005/0234622 A1 * | 10/2005 | Pillar | B65F 3/043 |
| | | | 701/41 |
| 2008/0133117 A1 | 6/2008 | Carlton et al. | |
| 2010/0114451 A1 | 5/2010 | Fujii et al. | |
| 2013/0158844 A1 | 6/2013 | Grahle | |
| 2015/0199522 A1 | 7/2015 | Wentz et al. | |
| 2017/0203826 A1 * | 7/2017 | Okuda | B63H 21/14 |
| 2017/0292250 A1 * | 10/2017 | Sato | E02F 9/2066 |
| 2018/0170374 A1 * | 6/2018 | Otsuka | B60W 30/0956 |
| 2019/0211795 A1 * | 7/2019 | Kanayama | F02P 5/16 |
| 2019/0236864 A1 * | 8/2019 | Cho | G07C 5/0808 |

FOREIGN PATENT DOCUMENTS

| | | |
|---|---|---|
| EP | 1219489 A2 | 7/2002 |
| JP | 2000-215066 | 8/2000 |
| JP | 2008-082283 | 4/2008 |
| JP | 2015-163786 | 9/2015 |
| WO | 2008066615 A1 | 6/2008 |
| WO | 2009/081631 | 7/2009 |

OTHER PUBLICATIONS

International Search Report, dated Jun. 20, 2017 (Jul. 20, 2017), 2 pages.
Chinese Office Action dated Jan. 20, 2021, 7 pages.

* cited by examiner

CONTROL DEVICE OF GENERAL-PURPOSE ENGINE

TECHNICAL FIELD

The present invention relates to a control device of a general-purpose engine.

BACKGROUND ART

A working machine using a general-purpose engine as a power source, such as a power generator, a pump, an outboard engine, a farm working machine, an earth-moving working machine, a truck, and a snow remover incudes an engine Electronic Control Unit (ECU) for controlling the general-purpose engine and a working machine ECU for entirely controlling the working machine so as to perform operation management of the working machine. When the two ECUs cooperate with each other, the working machine can make operations.

Patent Document 1 discloses a working machine in which when the working machine is in an abnormal state where a target rotation speed of an engine cannot be instructed from a working machine ECU to an engine ECU, the engine ECU performs control to rotate the engine at a predetermined fixed rotation speed, so that the working machine can be prevented from being disabled from working even in the abnormal state.

PRIOR ART DOCUMENT

Patent Document

Patent Document 1: JP-A-2008-82283

SUMMARY OF INVENTION

Problem to be Solved by the Invention

The working machine described in Patent Document 1 only consider a state as an abnormal state where the target rotation speed of the engine cannot be instructed from the working machine ECU to the engine ECU. Therefore, when the working machine ECU itself stops operating due to failure or the like, operations to the working machine are disabled accordingly such that a worker has to stop working.

The present invention has been made in view of the above circumstances, and an object of the present invention is to provide a control device of a general-purpose engine which can continue operation of a working machine even when an operation management unit of the working machine has failed.

Means for Solving the Problem

The above object can be achieved by a control device of a general-purpose engine which can be used as a power source of a working machine (e.g. a snow remover 1 in an embodiment), the control device including: an engine control unit (e.g. an engine control unit 14A in the embodiment) configured communicate with an operation management unit (e.g. a working machine ECU 21 in the embodiment) to control the general-purpose engine based on a command from the operation management unit, the operation management unit being included in the working machine using the general-purpose engine as the power source and configured to manage an operating state of the working machine; a communication interface (e.g. a communication I/F 13 in the embodiment) configured to communicate with an external device (e.g. an electronic device 30 in the embodiment); a management program acquisition unit (e.g. a management program acquisition unit 14B in the embodiment) configured to acquire a management program which is used by the operation management unit to manage the operating state, from the external device through the communication interface and store the acquired management program in a storage medium; and an operation management substitute unit (e.g. an operation management substitute unit 14C in the embodiment) configured to manage the operating state of the working machine in place of the operation management unit in accordance with the management program stored in the storage medium when a failure of the operation management unit is detected.

DESCRIPTION OF EMBODIMENT

An embodiment of the invention will be described below with reference to the drawings.

Figure 1:
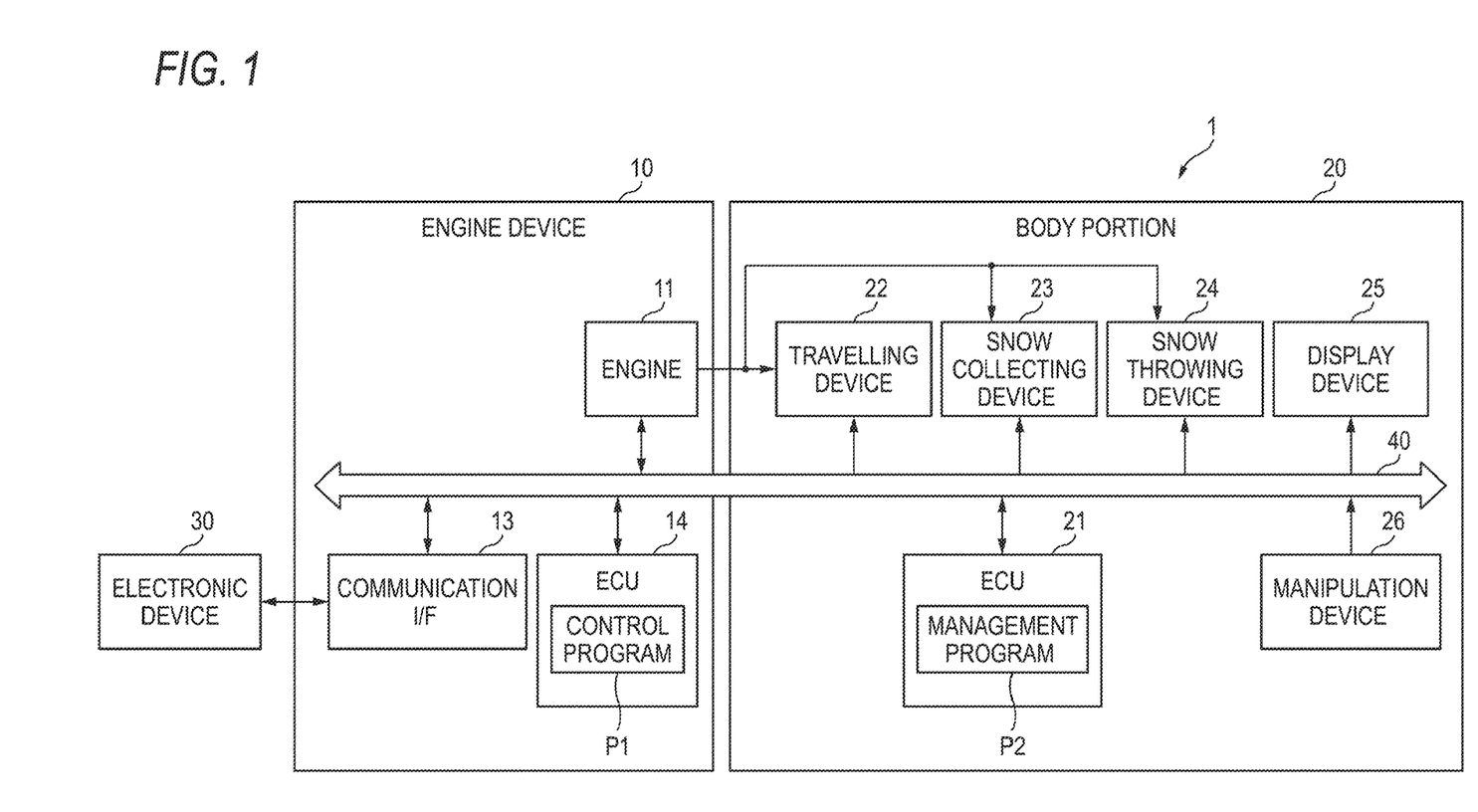
FIG. 1 is a block diagram showing a schematic configuration of a snow remover 1 which is an example of a working machine.

FIG. 1 is a block diagram showing a schematic configuration of a snow remover 1 which is an example of a working machine.

The snow remover 1 includes an engine device 10 and a main body unit 20.

The engine device 10 includes a general-purpose engine 11, a communication interface (I/F) 13, and an engine ECU 14.

The general-purpose engine 11 is, for example, an air-cooled two-cycle or four-cycle single-cylinder engine or the like which uses gasoline as fuel.

The communication I/F 13 is an interface for communicating with an electronic device 30 such as a smartphone which can be connected to a portable phone network, or an interface for directly connecting to the portable phone network.

The engine ECU 14 includes a microcomputer including a processor, a Read Only Memory (ROM) and a Random Access Memory (RAM) or the like. The engine ECU 14 is operated by electric power of a battery (not shown) charged by the motive power of the general-purpose engine 11.

A control program P1 for performing control of the general-purpose engine 11 and communication control using the communication I/F 13 is stored in advance in the ROM built in the engine ECU 14.

Based on the control program P1, the engine ECU 14 performs the control of the general-purpose engine 11 in accordance with a command from a working machine ECU 21 of the main body unit 20 and performs the communication control with an external device through the communication I/F 13.

A control device of the general-purpose engine 11 includes the communication I/F 13 and the engine ECU 14.

The main body unit 20 includes the working machine ECU 21, a travelling device 22, a snow collecting device 23, a snow throwing device 24, a display device 25, and a manipulation device 26.

The travelling device 22 includes a rotating body such as a wheel or a crawler, a drive shaft coupled to the rotating body, a transmission connected to the drive shaft, a travelling clutch for transmitting the motive power of the general-purpose engine 11 to the transmission, an assist motor for assisting manipulation of the travelling clutch, and a transmission motor for driving the transmission.

The snow collecting device 23 includes an auger including a spiral rotating blade, an auger housing for receiving the auger, an auger housing motor for driving the auger housing, an auger clutch for transmitting the motive power of the general-purpose engine 11 to the auger, and an auger clutch motor for driving the auger clutch.

The snow throwing device 24 includes a shooter, a shooter motor for changing a direction of the shooter, a blower for blowing off snow scraped by the auger from the shooter toward the outside, a blower clutch for transmitting the motive power of the general-purpose motor 11 to an impeller included in the blower, and a blower clutch motor for driving the blower clutch.

The display device 25 is a device for informing notification of information indicating various states of the snow remover 1. The display device 25 includes a failure notification lamp which is turned on when a failure occurs, a charge warning lamp which is turned on when abnormality occurs in a charging system of a battery, an oil warning lamp which is turned on when an amount of engine oil is small, and a battery warning lamp which is turned on or blinked when voltage of the battery drops.

The manipulation device 26 includes a travelling clutch lever for manipulating the travelling clutch included in the travelling device 22, a forward/backward speed adjustment lever for manipulating the transmission included in the travelling device 22, an auger adjustment lever for adjusting a position of the auger housing of the snow collecting device 23, a snow throwing direction adjustment lever for adjusting the direction of the shooter of the snow throwing device 24, a snow removal clutch button for manipulating the auger clutch motor included in the snow collecting device 23 and the blower clutch motor included in the snow throwing device 24, an engine rotation adjustment lever for adjusting a rotation speed of the general-purpose engine 11, and a mode changeover button for performing changeover of a snow removal mode.

The working machine ECU 21 includes a microcomputer including a processor, a ROM, a RAM and the like. The working machine ECU 21 is operated by electric power of a battery charged by the motive power of the general-purpose engine 11.

A management program P2 for performing management of an operating state of the snow remover 1 is stored in advance in the ROM built in the working machine ECU 21.

The general-purpose engine 11, the engine ECU 14, the communication I/F 13, the working machine ECU 21, the travelling device 22, the snow collecting device 23, the snow throwing device 24, the display device 25, and the manipulation device 26 are connected to a shared bus 40 to allow communication unidirectionally or bidirectionally.

The processor of the working machine ECU 21 in execution of the management program P2 controls the engine ECU 14, the travelling device 22, the snow collecting device 23, the snow throwing device 24 and the display device 25 respectively based on an instruction signal or the like outputted from the manipulation device 26 so as to perform management of the operating state of the snow remover 1. The processor of the working machine ECU 21 functions as an operation management unit.

Examples of management items of the operating state which are performed by the working machine ECU 21 in execution of the management program P2 will be listed as follows.

(Travelling Management)

When a signal instructing to start travelling is outputted from the travelling clutch lever, the working machine ECU 21 drives the assist motor to connect the travelling clutch to the transmission. When a signal instructing to stop the travelling is outputted from the travelling clutch lever, the working machine ECU 21 drives the assist motor to separate the travelling clutch from the transmission.

(Transmission Management)

When a signal instructing a travelling direction (forward movement or backward movement) and a travelling speed is outputted from the forward/backward speed adjustment lever, the working machine ECU 21 drives the transmission motor to control the transmission into a state corresponding to the instruction.

(Snow Removal Management)

When a signal instructing to start snow removal is outputted from the snow removal clutch button, the working machine ECU 21 drives the auger clutch motor and the blower clutch motor to control the auger and the blower into an operating state. When a signal instructing to stop the snow removal is outputted from the snow removal clutch button, the working machine ECU 21 drives the auger clutch motor and the blower clutch motor to control the auger and the blower into a stop state.

(Snow Throwing Direction Management)

When a signal instructing a direction of the shooter is outputted from the snow throwing direction adjustment lever, the working machine ECU 21 drives the shooter motor to change the direction of the shooter.

(Auger Position Management)

When a signal instructing a position of the auger housing is outputted from the auger adjustment lever, the working machine ECU 21 drives the auger housing motor to change a direction of the auger housing.

(Rotation Speed Management)

When a signal instructing a rotation speed of the general-purpose engine 11 is outputted from the engine rotation adjustment lever, the working machine ECU 21 issues a command to the engine ECU 14 to operate the general-purpose engine 11 at the instructed rotation speed. Upon reception of the command, the engine ECU 14 controls the general-purpose engine 11 so as to make the engine speed equal to the instructed rotation speed.

(Snow Removal Mode Management)

When a signal instructing to set an automatic mode as an operating mode is outputted from the mode changeover button, the working machine ECU 21 controls a travelling speed of the snow remover 1 performed by the travelling device 22 in accordance with a load of snow removal work, and issues a command to the engine ECU 14 so as to make the engine speed correspond to the operating condition.

When a signal instructing to set a manual mode as the operating mode is outputted from the mode changeover button, the working machine ECU 21 issues a command to the engine ECU 14 so as to make the engine speed equal to a rotation speed inputted from the engine rotation adjustment lever, and controls the travelling device 22 so as to make the travelling speed of the snow remover 1 equal to a target speed inputted from the forward/backward speed adjustment lever.

(Display Management)

The working machine ECU 21 performs control to turn on the oil warning lamp based on remaining amount information of the engine oil notified by the engine ECU 14, performs control to turn on the charge warning lamp or the battery warning lamp based on a state of the battery, or performs control to turn on the failure notification lamp when a failure occurs in hardware of the snow remover 1.

Figure 2:
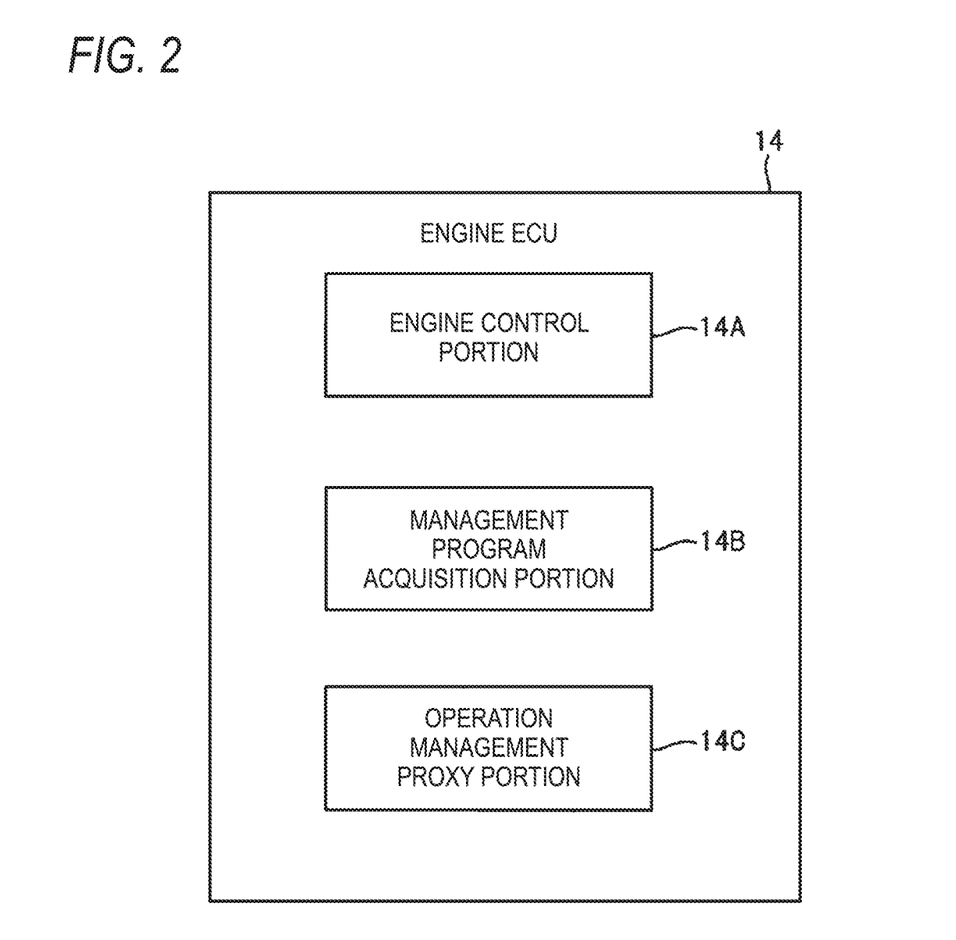
FIG. 2 is a functional block diagram of an engine ECU 14 in the snow remover 1 shown in FIG. 1.

FIG. 2 is a functional block diagram of the engine ECU 14 in the snow remover 1 shown in FIG. 1.

The processor of the engine ECU 14 which is in execution of the control program P1 functions as an engine control unit 14A, a management program acquisition unit 14B, and an operation management substitute unit 14C.

The engine control unit 14A performs control of the rotation speed of the general-purpose engine 11 in accordance with a command from the working machine ECU 21.

The management program acquisition unit 14B acquires the same program as the management program P2 stored in the ROM built in the working machine ECU 21 from an external device through the communication I/F 13 and stores the program in the ROM serving as a storage medium built in the engine ECU 14.

For example, when an owner of the snow remover 1 installs an application program for management of the snow remover 1 into the electronic device 30 such as the smartphone held by the owner, the management program P2 is stored in the electronic device 30 at the time of the installation.

Upon reception of a transmission instruction of the management program P2 from the engine device 10, the electronic device 30 transmits the management program P2 stored therein to the engine device 10 by a function of the application program.

When a failure of the working machine ECU 21 is detected, the operation management substitute unit 14C performs management of the operating state of the snow remover 1 in place of the working machine ECU 21 in accordance with the management program P2 stored in the ROM of the engine ECU 14.

The operation management substitute unit 14C, for example, periodically transmits a signal for operation confirmation to the working machine ECU 21. When no response to the signal is sent from the working machine ECU 21, the operation management substitute unit 14C detects that the working machine ECU 21 has failed.

Figure 3:
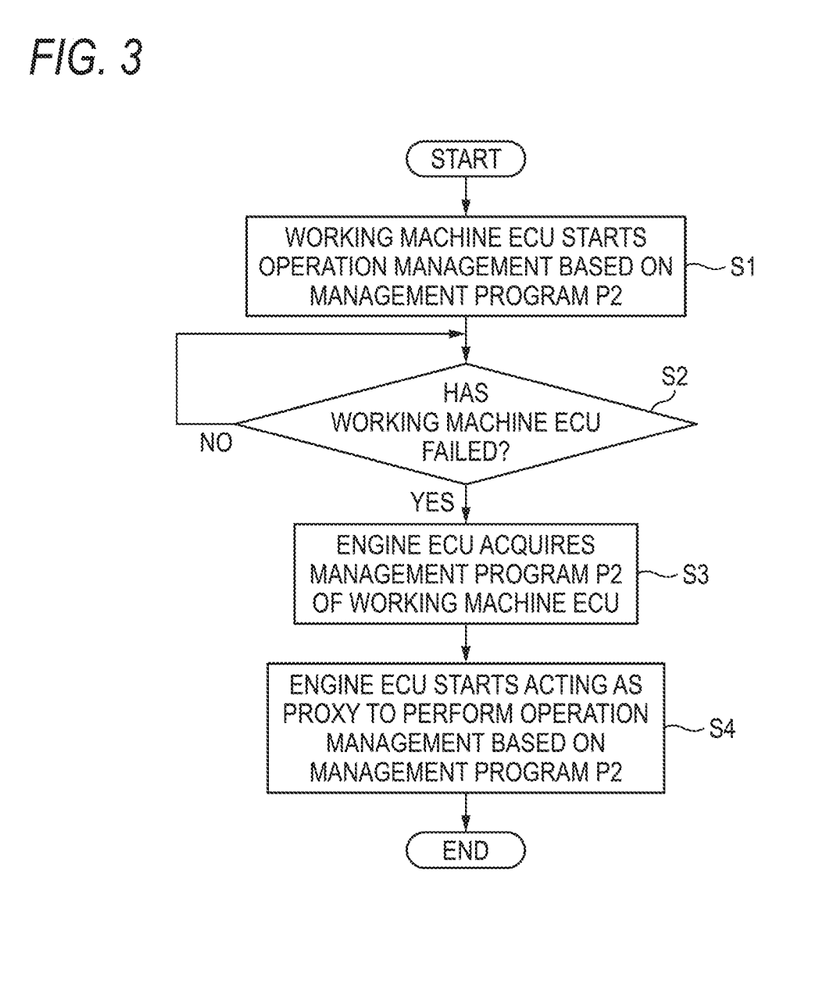
FIG. 3 is a flow chart for explaining operation of the snow remover 1 shown in FIG. 1.

FIG. 3 is a flow chart for explaining operation of the snow remover 1 shown in FIG. 1.

When the engine ECU 14 and the working machine ECU 21 are started activated, the working machine ECU 21 starts management of an operating state of the snow remover 1 based on the management program P2 (step S1).

When the management of the operating state is started, presence/absence of failure of the working machine ECU 21 is determined periodically by the operation management substitute unit 14C of the engine ECU 14 (step S2). When the failure of the working machine ECU 21 is not detected (step S2: NO), the management of the operating state performed by the working machine ECU 21 is continued.

On the other hand, when the failure of the working machine ECU 21 is detected (step S2: YES), the management program P2 is acquired from the electronic device 30 by the management program acquisition unit 14B of the engine ECU 14, and the management program P2 is stored in the ROM of the engine ECU 14 (step S3).

The operation management substitute unit 14C of the engine ECU 14 executes the management program P2 acquired in the step S3 and starts to perform the management of the operating state of the snow remover 1 in place (step S4).

Specifically, the operation management substitute unit 14C acquires a signal outputted from the manipulation device 26 and executes the travelling management, the transmission management, the snow removal management, the snow throwing direction management, the auger position management, the rotation speed management, the snow removal mode management, and the display management in accordance with the signal.

According to the engine device 10 mounted in the snow remover 1 shown in FIG. 1, the engine ECU 14 performs the management of the operating state in place of the working machine ECU 21 even when the working machine ECU 21 has failed. Accordingly, a user of the snow remover 1 can continue snow removal work.

Incidentally, the timing when the management program acquisition unit 14B acquires the management program P2 from the electronic device 30 is not limited to the timing when the failure of the working machine ECU 21 is detected. For example, the management program P2 may be acquired at a timing when the engine ECU 14 is activated or at any timing during a period of time when the working machine ECU 21 is in execution of the management of the operating state.

The operation management substitute unit 14C may not perform all the management items of the operating state of the working machine ECU 21 in place but perform only some of all the management items.

For example, in the step S4 of FIG. 3, the operation management substitute unit 14C performs management items (specifically, the travelling management and the transmission management) necessary for movement of the snow remover 1 and a portion of the display management (specifically, the control to light the failure notification lamp) in place. Accordingly, the snow remover 1 can be at least moved even when the working machine ECU 21 has failed. Therefore, the snow remover 1 can be moved from a workplace and a repair request of the snow remover 1 can be made smoothly. As a result, usability can be improved.

The operation management substitute unit 14C may control the number of the management items the operation management substitute unit 14C should perform in place according to a processing load of the processor of the engine ECU 14. The processing load of the processor of the engine ECU 14 can be obtained, for example, from a usage rate of the RAM built in the engine ECU 14.

For example, the operation management substitute unit 14C sets three thresholds for the processing load of the processor of the engine ECU 14, i.e. a threshold TH1, a threshold TH2 larger than the threshold TH1, and a threshold TH3 larger than the threshold TH2.

When the processing load of the processor of the engine ECU 14 is smaller than the threshold TH1, the operation management substitute unit 14C performs all the management items of the working machine ECU 21 in place.

When the processing load of the processor of the engine ECU 14 is not smaller than the threshold TH1 but smaller than the threshold TH2, the operation management substitute unit 14C performs, of all the management items of the working machine ECU 21, management items (specifically, the travelling management, the transmission management, the snow removal management, the snow throwing direction management, the auger position management, and the rotation speed management) necessary for high-level snow removal work, and the portion of the display management (specifically, the control to light the failure notification lamp) in place.

When the processing load of the processor of the engine ECU 14 is not smaller than the threshold TH2 but smaller than the threshold TH3, the operation management substitute unit 14C performs, of all the management items of the working machine ECU 21, minimum management items (specifically, the travelling management, the transmission management, the snow removal management, and the auger position management) necessary for the snow removal work, and the portion of the display management (specifically, the control to light the failure notification lamp) in place.

When the processing load of the processor of the engine ECU 14 is not smaller than the threshold TH3, the operation management substitute unit 14C performs, of all the management items of the working machine ECU 21, management items (specifically, the travelling management and the transmission management) necessary for movement of the snow remover 1, and the portion of the display management (specifically, the control to light the failure notification lamp) in place.

Thus, the operation management substitute unit 14C can change the number of the management items the operation management substitute unit 14C should perform in place according to the processing load of the processor of the engine ECU 14. Consequently, performance of the engine ECU 14 can be prevented from being lowered and the snow remover 1 can be operated smoothly.

Figure 4:
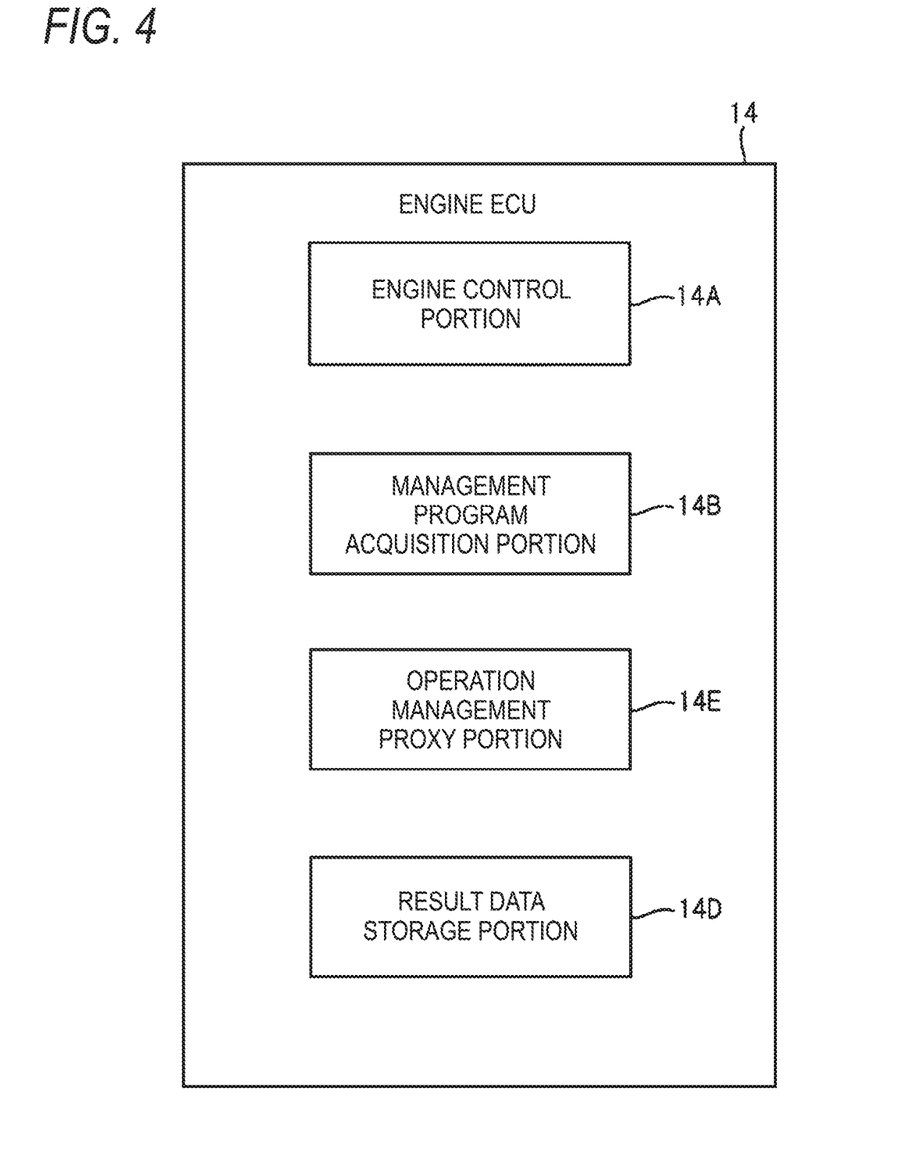
FIG. 4 is a view showing a modification of the functional block of the engine ECU 14 shown in FIG. 2.

FIG. 4 is a view showing a modification of the functional block of the engine ECU 14 shown in FIG. 2. In FIG. 4, constituent elements the same as those in FIG. 2 are referred to by the same signs correspondingly and respectively.

When a processor of the engine ECU 14 shown in FIG. 4 is in execution of the control program P1, the engine ECU 14 functions as an engine control unit 14A, a management program acquisition unit 14B, an operation management substitute unit 14E and a record data storage unit 14D.

The record data storage unit 14D acquires record data from the working machine ECU 21 and stores the acquired record data into a ROM of the engine ECU 14. The record data indicate a management record of an operating state performed by the working machine ECU 21.

Whenever the working machine ECU 21 has performed travelling management and transmission management which are management items necessary for movement of the snow remover 1, the working machine ECU 21 transmits, to the engine ECU 14, control contents performed in response to a signal outputted from the travelling clutch lever, and control contents performed in response to a signal outputted from the forward/backward speed adjustment lever, as the record data.

The operation management substitute unit 14E has the same function as the operation management substitute unit 14C shown in FIG. 2. However, when the operation management substitute unit 14E detects failure of the working machine ECU 21 and communication with an external device through the communication I/F 13 is disabled in a state where the management program P2 has not yet been stored in the ROM by the management program acquisition unit 14B (the operation management substitute unit 14E is disabled from performing management of the operating state in place in accordance with the management program P2). In this case, the operation management substitute unit 14E performs the management of the operating state of the snow remover 1 in place based on the record data stored in the ROM by the record data storage unit 14D.

Figure 5:
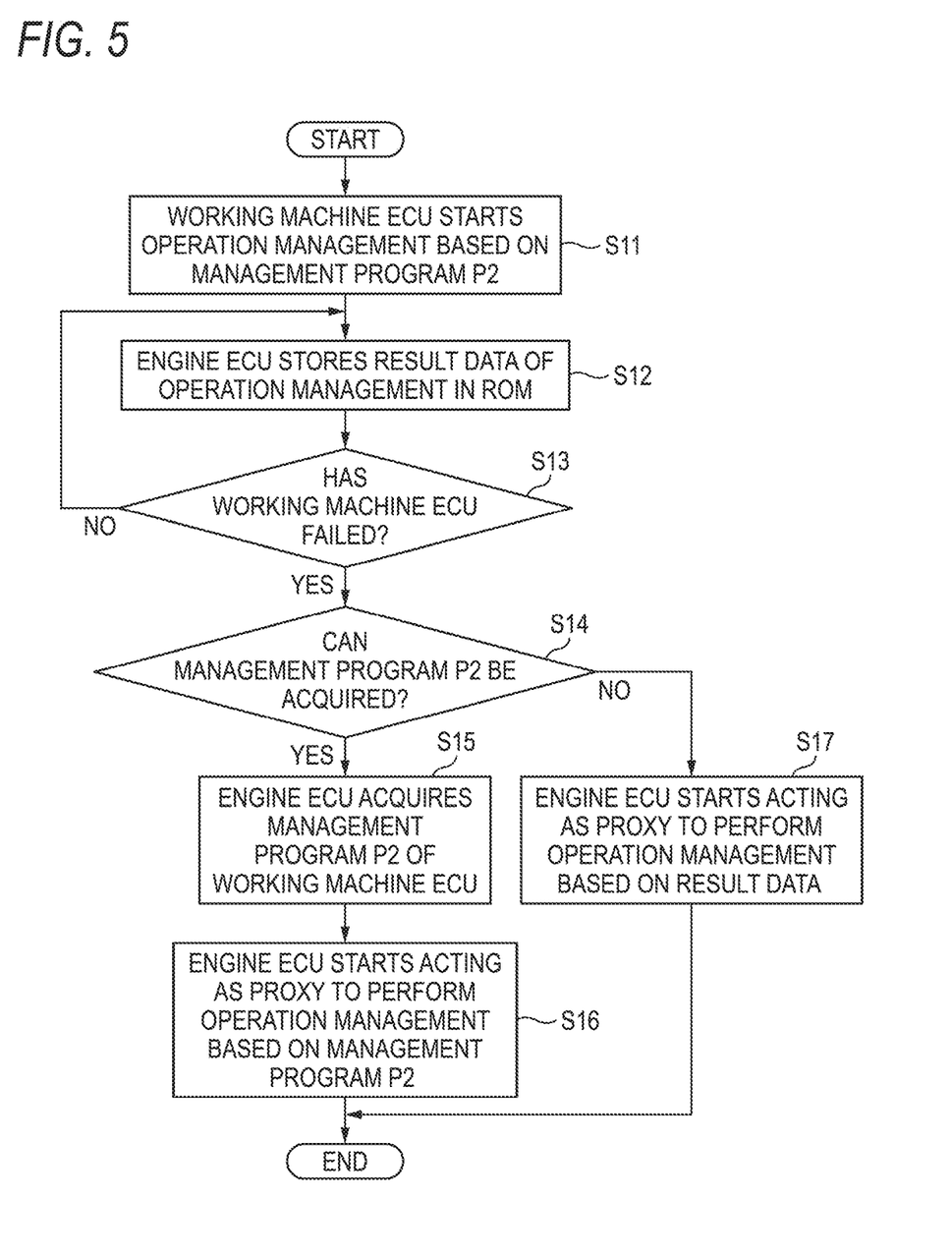
FIG. 5 is a flow chart for explaining operation of the snow remover 1 including the engine ECU 14 shown in FIG. 4.

FIG. 5 is a flow chart for explaining operation of the snow remover 1 including the engine ECU 14 shown in FIG. 4.

When the engine ECU 14 and the working machine ECU 21 are activated, the working machine ECU 21 starts management of an operating state of the snow remover 1 based on the management program P2 (step S11).

When travelling management and transmission management are performed by the working machine ECU 21, record data of the managements are transmitted from the working machine ECU 21 to the engine ECU 14, and the record data are stored in the ROM of the engine ECU 14 by the record data storage unit 14D of the engine ECU 14 (step S12).

When the management of the operating state is started by the working machine ECU 21, presence/absence of failure of the working machine ECU 21 is determined periodically by the operation management substitute unit 14E of the engine ECU 14 (step S13). When the failure of the working machine ECU 21 is not detected (step S13: NO), the management of the operating state performed by the working machine ECU 21 is continued.

On the other hand, when the failure of the working machine ECU 21 is detected (step S13: YES), the operation management substitute unit 14E determines whether the management program P2 can be acquired by the management program acquisition unit 14B (step S14).

When intensity of a radio wave required for communication using the communication I/F 13 is too weak to communicate with any external device, when the intensity of the radio wave is strong but the electronic device 30 is absent from the neighborhood, or when access to a server providing the management program P2 cannot be accessed, it is determined that the management program P2 cannot be acquired.

When communication with the electronic device 30 can be made such that it is determined that the management program P2 can be acquired (step S14: YES), the management program P2 is acquired by the management program acquisition unit 14B (step S15). The operation management substitute unit 14E executes the management program P2 acquired in the step S15 and starts to perform the management of the operating state of the snow remover 1 in place (step S16).

On the other hand, when it is determined that the management program P2 cannot be acquired (step S14: NO), the operation management substitute unit 14E starts to perform travelling management and transmission management of the snow remover 1 in place based on the record data which have been stored in the ROM in the step S12 (step S17).

For example, when a signal instructing to start travelling is outputted from the travelling clutch lever, the operation management substitute unit 14E refers to the record data and performs control (driving of the assist motor) corresponding to the signal. For example, when a signal instructing to move forward and travel at high speed is outputted from the forward/backward speed adjustment lever, the operation management substitute unit 14E refers to the record data and performs control (driving of the transmission motor) corresponding to the signal.

Incidentally, when a signal not included in the record data is outputted from the manipulation device 26, the operation management substitute unit 14E does not perform any control in response to the signal.

According to the engine ECU 14 shown in FIG. 4, as described above, it is possible to perform the travelling management and the transmission management of the management of the operating state of the snow remover 1 in place even when the management program P2 cannot be acquired. The travelling management and the transmission management are performed highly frequently when the snow remover 1 is used. Therefore, the travelling management and the transmission management can be performed based on the record data without any problem. Thus, at least the snow remover 1 can be moved even when the working machine ECU 21 has failed.

Incidentally, in the description of FIG. 5, only the data about the travelling management and the transmission management are stored as the record data in the ROM of the engine ECU 14. However, the record data are not limited thereto.

For example, record data indicating a signal outputted from the snow removal clutch button and control contents of the auger clutch motor and the blower clutch motor in response to the signal may be stored in the ROM of the engine ECU 14. In this case, at least snow remover work can be performed even when the working machine ECU 21 has failed.

In addition, record data in which signals outputted from the manipulation device 26 about all the management items to be performed by the working machine ECU 21 are associated with control contents corresponding to the signals may be designed to be stored in the ROM of the engine ECU 14. In this manner, the operation management substitute unit 14E can perform a larger number of management items of the operating state in place. Thus, it is possible to prevent the function of the snow remover 1 from being limited during the failure of the working machine ECU 21.

The present invention is not limited to the above-described embodiments. Any modification, improvement, or the like can be made on the invention suitably.

For example, the snow remover is exemplified as a working machine in the above description. However, the control device of the general-purpose engine according to the present invention may be applied to any working machine as long as the working machine includes a general-purpose engine as a power source and an ECU.

The above object can be achieved by the following (1) to (4).

(1) A control device of a general-purpose engine which can be used as a power source of a working machine (e.g. a snow remover 1 in an embodiment), the control device including: an engine control unit (e.g. an engine control unit 14A in the embodiment) configured communicate with an operation management unit (e.g. a working machine ECU 21 in the embodiment) to control the general-purpose engine based on a command from the operation management unit, the operation management unit being included in the working machine using the general-purpose engine as the power source and configured to manage an operating state of the working machine; a communication interface (e.g. a communication I/F 13 in the embodiment) configured to communicate with an external device (e.g. an electronic device 30 in the embodiment); a management program acquisition unit (e.g. a management program acquisition unit 14B in the embodiment) configured to acquire a management program which is used by the operation management unit to manage the operating state, from the external device through the communication interface and store the acquired management program in a storage medium; and an operation management substitute unit (e.g. an operation management substitute unit 14C in the embodiment) configured to manage the operating state of the working machine in place of the operation management unit in accordance with the management program stored in the storage medium when a failure of the operation management unit is detected.

(2) The control device of a general-purpose engine according to (1), further includes a record data storage unit (e.g. a record data storage unit 14D in the embodiment) configured to store in the storage medium record data indicating a record of management performed by the operation management unit in a state where the working machine is in operation, wherein the operation management substitute unit is configured to manage the operating state of the working machine based on the record data stored by the record data storage unit when the operation management substitute unit detects the failure of the operation management unit and communication with the external device is disabled in a state where the management program has not yet been stored by the management program acquisition unit.

(3) In the control device of a general-purpose engine according to (1) or (2), when managing the operating state in accordance with the management program, the operation management substitute unit is configured to manage only some of all management items of the operating state in place of the operation management unit.

(4) In the control device of a general-purpose engine according to (1) or (2), when managing the operating state in accordance with the management program, the operation management substitute unit is configured to manage a number of management items of the operating state in place of the operation management unit, and the number of the management items is smaller when a processing load of the control device is not smaller than a threshold than that when the processing load is smaller than the threshold.

According to (1), even when the operation management unit has failed, the management of the operating state is continued by the operation management substitute unit, so that work performed by the working machine can be continued.

According to (2), even when the operation management unit has failed and the management program cannot be acquired, the management of the operating state is continued based on the record data, so that operation of the working machine can be continued.

According to (3), a processing load of the control device can be reduced, so that performance of the control device can be prevented from being lowered.

According to (4), the number of the management items can be controlled in accordance with the processing load of the control device, so that the performance of the control device can be prevented from being lowered.

The invention claimed is:

1. A control device of a general-purpose engine which is used as a power source of a working machine, the control device comprising:

an engine control unit configured to control the general-purpose engine in response to a command from an operation management unit external to the control device, the operation management unit being included in the working machine and configured to control an operation of the working machine based on a management program;

a communication interface configured to communicate with an external device to obtain the management program from the external device;

a management program acquisition unit configured to acquire the management program from the external device through the communication interface;

a storage medium configured to store the management program acquired by the management program acquisition unit; and an operation management substitute unit which is configured to control the operation of the working machine in place of the operation management unit included in the working machine in accordance with the management program stored in the storage medium when a failure of the operation management unit included in the working machine is detected, wherein the control device is configured to control the operation of the working machine in addition to the control of the general-purpose engine, when the failure of the operation management unit included in the working machine is detected.

2. The control device of a general-purpose engine according to claim 1, further comprising:

a record data storage unit configured to acquire control contents performed by the operation management part in a state where the working machine is in operation and configured to store the control contents in the storage medium as record data, wherein the operation management substitute unit is configured to control the operation of the working machine based on the record data stored by the storage medium when the operation management substitute unit detects the failure of the operation management unit and communication with the external device is disabled in a state where the management program has not yet been stored by the management program acquisition unit.

3. The control device of a general-purpose engine according to claim 1, wherein when controlling the operation in accordance with the management program, the operation management substitute unit is configured to control only some of operation control items including at least items related to travel of the working machine in place of the operation management unit.

4. The control device of a general-purpose engine according to claim 1, wherein when a processing load of the control device is not smaller than a threshold, the operation management substitute unit sets a number of control items of the operation of the working machine in accordance with the management program in place of the operation management unit to be smaller than when the processing load is smaller than the threshold.

* * * * *